United States Patent
Tanaka

[11] Patent Number: 6,151,072
[45] Date of Patent: *Nov. 21, 2000

[54] METHOD OF CONTROLLING AUTOMATIC FOCUSING IN A VIDEO CAMERA FOR DIFFERENT AMBIENT LIGHT CONDITIONS

[75] Inventor: Kazuhisa Tanaka, Omiya, Japan

[73] Assignee: Fuji Photo Optical Co., Ltd., Saitama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/763,785

[22] Filed: Dec. 11, 1996

[30] Foreign Application Priority Data

Dec. 22, 1995 [JP] Japan .................................. 7-334592

[51] Int. Cl.[7] .................................................. H04N 5/232
[52] U.S. Cl. ........................... 348/353; 348/229; 348/358; 348/353
[58] Field of Search ..................................... 348/348, 347, 348/349, 353, 354, 355, 356, 229, 230, 369, 363, 358; 396/102, 104, 111, 133; H04N 5/232

[56] References Cited

U.S. PATENT DOCUMENTS

| | | | |
|---|---|---|---|
| 4,931,821 | 6/1990 | Hamada et al. | 396/102 |
| 5,349,382 | 9/1994 | Tamura | 348/345 |
| 5,604,537 | 2/1997 | Yamazaki et al. | 348/350 |

Primary Examiner—Tuan Ho

[57] ABSTRACT

A method of controlling automatic focusing in a video camera which has an automatic focusing means for focusing a taking lens in a contrast detecting method, an automatic iris means for controlling an iris according to the brightness of an object, and an automatic gain controlling means for increasing gain of a video signal obtained from image pickup means when a signal level of the video signal is low. The taking lens is made to focus on a point at infinity if the following three conditions are fulfilled: the iris is fully opened by the automatic iris means, and the gain is increased to the maximum extent possible by the automatic gain controlling means, and the taking lens is in a wide-angle state. Thereby, even in the dark at night, the photographing can be performed with the object being in focus.

11 Claims, 3 Drawing Sheets

METHOD OF CONTROLLING AUTOMATIC FOCUSING IN A VIDEO CAMERA FOR DIFFERENT AMBIENT LIGHT CONDITIONS

BACKGROUND OF THE INVENTION

1. Field of the Invention

The present invention relates to a method of controlling automatic focusing in a video camera. More particularly, the present invention pertains to a method of controlling automatic focusing, which is suitable for photographing night views.

2. Description of the Related Art

The recently developed video camera for household use has rapidly improved its picture quality. With this improvement, the performance has also improved in automatic controlling such as automatic focusing (hereinafter refereed to as AF).

Most AF is performed using the contrast detecting method which is called uphill AF, and the performance depends on the clearness of an object. A case in point, when the object such as a night view, of which the luminance (illuminance) is low on the whole screen, is photographed, the performance deteriorates significantly. Depending on the situation, an error takes place sometimes, causing the object to be out of focus.

Conventionally, if the object such as the night view has an extremely low luminance, an automatic gain control (AGC) is performed so as to amplify a video signal to make a contrast on an image, or a special mode such as a twilight mode is provided to lower the shutter speed.

The AGC, however, has such a disadvantage in that the noise increases and signal-to-noise ratio lowers. Thereby, a video signal effective for AF control cannot be obtained, and the focusing cannot be accurately performed in many cases. On the other hand, in the case of the photographing in the twilight mode, the image looks like as if the frames were fed one by one. For this reason, even if AF becomes possible, the video image does not look natural.

Manual focusing is performed in some methods, but it has a disadvantage in that it depends on the user's technical skill, and it negates the full automation which is currently the mainstream.

SUMMARY OF THE INVENTION

The present invention has been developed in view of the above-described circumstances, and has as its object the provision of a method of controlling automatic focusing in a video camera, which can photograph night views under optimum conditions.

In order to achieve the above-mentioned object, the method of controlling automatic focusing in the video camera which has an automatic focusing means for focusing, a taking lens in a contrast detecting method, an automatic iris means for controlling an iris according to the brightness of an object, and an automatic gain controlling means for increasing the gain of a video signal obtained from an image pickup means when a signal level of the video signal is low; is characterized in that the taking lens is made to focus on a point at infinity if the following three conditions are fulfilled: the iris is fully opened by the automatic iris means, and the gain is increased to the maximum extent possible by the automatic gain controlling means, and the taking lens is in a wide-angle state.

When the night view is photographed, an object is usually a great distance away. Particularly when the taking lens is in the wide-angle state, an image of the object, which is at more than several meters, is formed on the focal plane which is almost same as a focal plane on which an object at infinity is formed. Under the above-mentioned predetermined conditions required for determining that the night view is photographed, the normal AF is not performed, and the taking lens is made to focus on a point at infinity to thereby enable photographing the object being in focus even in the dark at night.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
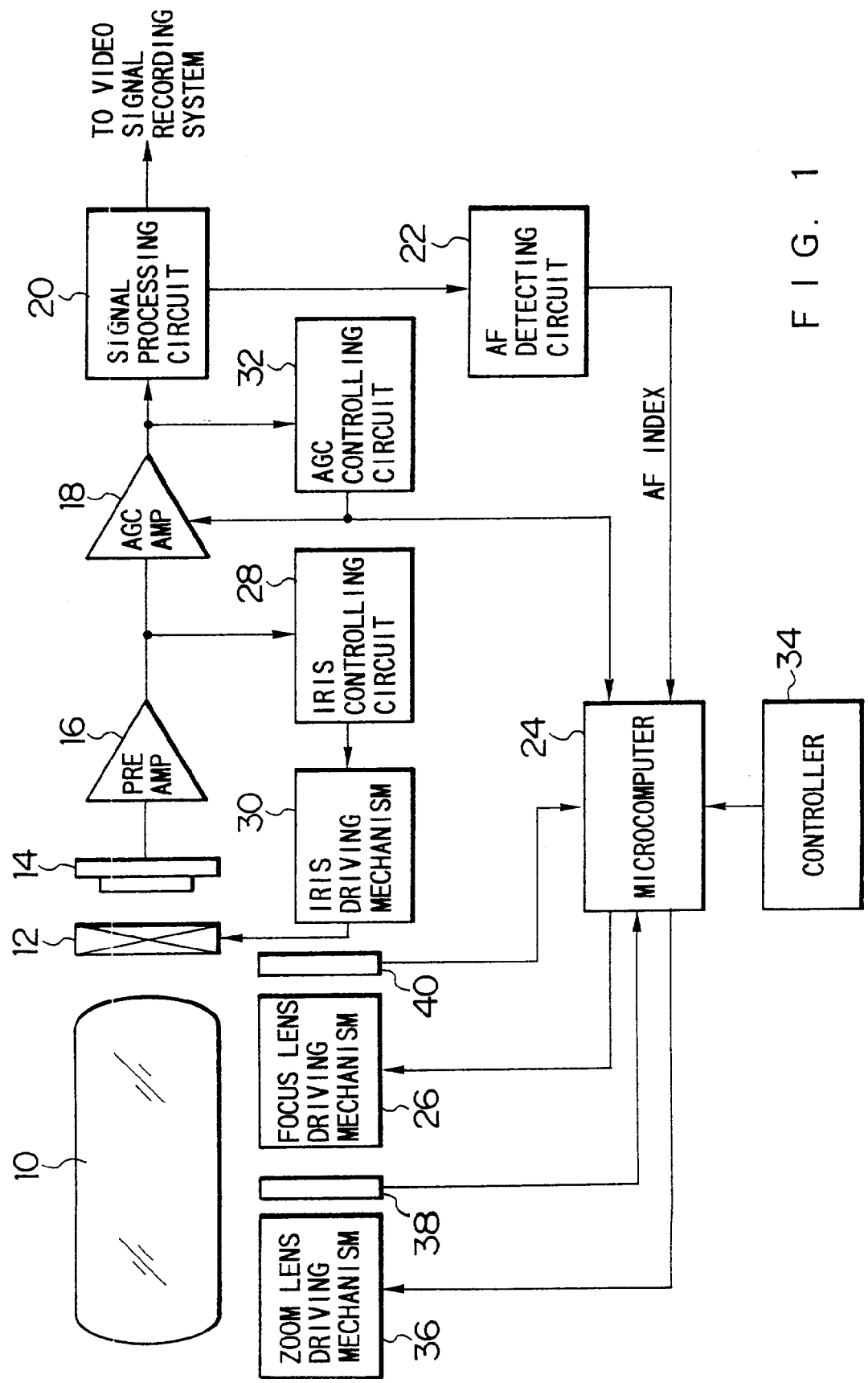
FIG. 1 is a block diagram illustrating the essential parts of a video camera to which a method of controlling automatic focusing according to the present invention applies.

FIG. 1 is a block diagram illustrating the essential parts of a video camera to which a method of controlling automatic focusing according to the present invention applies.

In FIG. 1, an object's light is formed on a light-accepting surface of a solid state imaging element such as a charge coupled device (CCD) 14, and the object's light is converted into signal charge in accordance with the intensity of the light in each sensor of the CCD 14. The output signal of the CCD 14 is amplified by a preamplifier 16 and an AGC amplifier 18, and then the signal is received by a signal processing circuit 20.

The signal processing circuit 20 includes a white balance circuit, a γ-correction circuit, a matrix circuit, and an encoder circuit. The signal processing circuit 20 executes a predetermined signal processing in these circuits, and then it outputs for example NTSC (National Television System Committee) video signal to a video tape recorder (VTR) (not shown). In the VTR, the input video signal is converted into a record signal suitable for magnetic recording, and then the record signal is magnetically recorded onto a recording medium such as a video tape via a magnetic head.

The video camera has an AF device for focusing the taking lens 10 in a contrast detecting method, an automatic iris device, and an AGC device. These devices will be described below.

The AF device is composed mainly of an AF detecting circuit 22, a microcomputer 24, and a focus lens driving mechanism 26. The AF detecting circuit 22 is composed mainly of a highpass filter and an integrating circuit. The AF detecting circuit 22 extracts only high-frequency components from luminance signals which are sent from the signal processing circuit 20. Then the AF detecting circuit 22 integrates the extracted components and sends the integrated value to the microcomputer 24 as a focus index used for determining whether the object is in focus or not. The microcomputer 24 sends a control signal to the focus lens driving mechanism 26 so that the focus index sent from the AF detecting circuit 22 can be at its maximum, thereby driving a focus lens within the taking lens 10 to focus the taking lens 10 on the object.

The automatic iris device is composed mainly of an iris controlling circuit 28 and an iris driving mechanism 30. The iris controlling circuit 28 consists of a detecting circuit, an integrating circuit, etc., and receives an electric signal from the preamplifier 16. Then, the iris controlling circuit 28 integrates the signal for one field, and the integrated value is an iris index. On the other hand, an iris reference value is set beforehand in the iris controlling circuit 28, and the iris controlling circuit 28 compares the iris index with the iris reference value. When the iris index is more than the iris reference value, the iris controlling circuit 28 determines that it is too bright, and drives an iris 12 by the iris driving mechanism 30 in such a direction as to close the iris 12. On the other hand, if the iris index is less than the iris reference value, the iris controlling circuit 28 determines that it is too dark, and drives the iris 12 by the iris driving mechanism 30 in such a direction as to open the iris 12.

The AGC device is composed of the AGC amplifier 18 and an AGC controlling circuit 32. The AGC controlling circuit 32 consists of a detecting circuit, an integrating circuit, etc., and receives an electric signal from the AGC amplifier 18. Then, the AGC controlling circuit 32 integrates the signal for one field, and the integrated value is an AGC index. On the other hand, an AGC reference value is set beforehand in the AGC controlling circuit 32, and the AGC controlling circuit 32 compares the AGC index with the AGC reference value. When the AGC index is more than the AGC reference value, the AGC controlling circuit 32 determines that the output of the AGC amplifier 18 is too large, and sends a gain control signal to the AGC amplifier 18 in such a manner as to lower the gain of the AGC amplifier 18. On the other hand, if the AGC index is less than the AGC reference value, the AGC controlling circuit 32 determines that the output of the AGC amplifier 18 is too small, and sends a gain control signal to the AGC amplifier 18 in such a manner as to raise the gain of the AGC amplifier 18.

The microcomputer 24 receives a variety of signals from a controller 34, which has a photographing start/stop button, a zoom switch, a night view photographing mode switch, etc. When the zoom switch is manipulated, the microcomputer 24 moves a variable magnification lens, etc. of the taking lens 10 by a zoom lens driving mechanism 36 to change the magnification. The microcomputer 24 also receives a zoom signal from a sensor 38, which detects a zooming position of the taking lens 12, and a sensor 40, which measures the opening of the iris 12. Further, the microcomputer 24 receives the gain control signal from the AGC controlling circuit 32. The microcomputer 24 determines whether the night view is photographed or not according to the above-mentioned received signals and a signal sent from the night view photographing mode switch of the controller 34. When determining that the night view is being photographed, the microcomputer 24 does not perform the normal AF by the AF device, but sends a control signal to the focus lens driving mechanism 26 so that the taking lens 10 can focus on a point at infinity.

Next, a detailed explanation will be given about the above-mentioned method of controlling the automatic focusing with reference to the flow charts of FIGS. 2 and 3.

Figure 2:
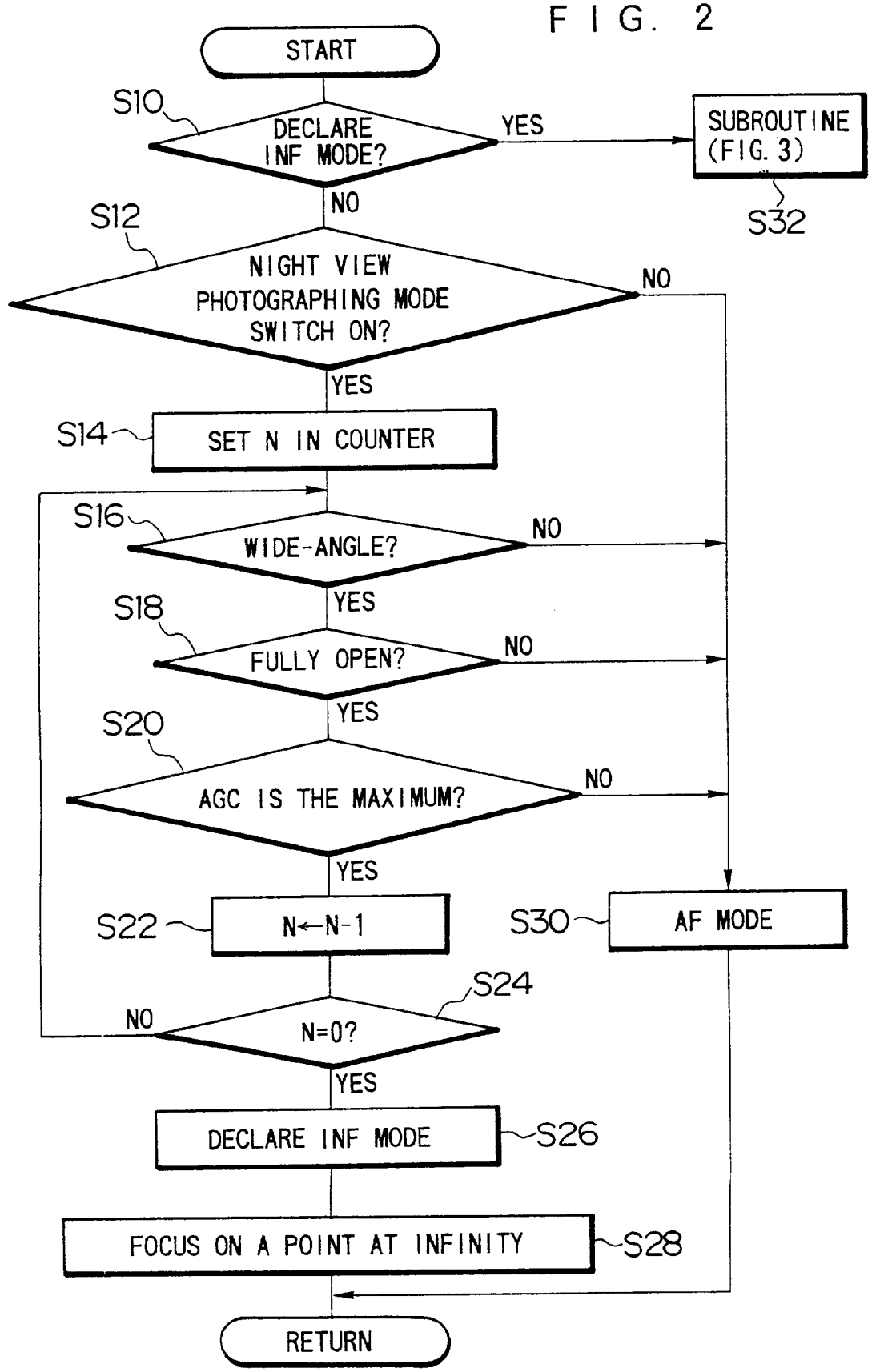
FIG. 2 is a flow chart for explaining a method of controlling automatic focusing in a video camera according to the present invention.

As shown in FIG. 2, it is first determined whether a mode in which the taking lens 10 is kept focusing on a point at infinity (an INF mode) has been entered or not (S10). The photographing starts in a mode for performing the normal automatic focusing by the AF device (an AF mode). In the step S10, if the INF mode has not been entered, it is determined whether the night view photographing mode switch at the controller 34 is on or not (S12).

If the night view photographing mode switch is on, it is determined whether the conditions, which are required for determining that the night view is photographed, are fulfilled for more than a predetermined period of time (two seconds for example) or not. That is, N is set in a counter in order to check the predetermined time (S14), and the following matters are determined: whether the taking lens 10 is in a wide-angle state or not (S16), whether the iris 12 is fully opened or not (S18), and whether the gain of the AGC amplifier 18 is the largest or not (S20).

If the conditions in the steps S16, S18, and S20 are fulfilled, 1 is subtracted from N in the counter (S22), and it is determined whether the subtracted N is 0 or not (S24). If N in the counter is not 0, the process returns to the step S16, and it is determined again whether the abovementioned conditions are fulfilled. If N in the counter is 0, the INF mode is declared (S26), and the taking lens 10 is made to focus on a point at infinity (S28).

That is, when the night view is photographed, the object is usually considered at infinity in a standard of focusing steps. Particularly in the wide-angle state, a point which is at a distance of several meters from the camera is regarded as being at infinity. For this reason, the object which is photographed in the wide-angle state of low luminance can be considered to be the infinite night view except for the unusual case when the object is photographed at close range. Hence, if the above-mentioned conditions are fulfilled for a predetermined period of time, that is, if the taking lens 10 is in the wide-angle state (S16) and the iris 12 is fully opened (S18) and the AGC gain is the largest (S20), the taking lens 10 is made to focus on a point at infinity.

On the other hand, if the night view photographing mode switch is off (S12), or one or more of the conditions determined in Steps S16, S18 and S20 is not fulfilled before the predetermined time has passed (N=0), the process returns to START with the normal AF mode being kept.

Once the INF mode is declared and the taking lens 10 is made to focus on a point at infinity (S26, S28), the process goes on from the step S10 to the subroutine (S32), and it is determined whether the INF mode should be returned to the AF mode.

Figure 3:
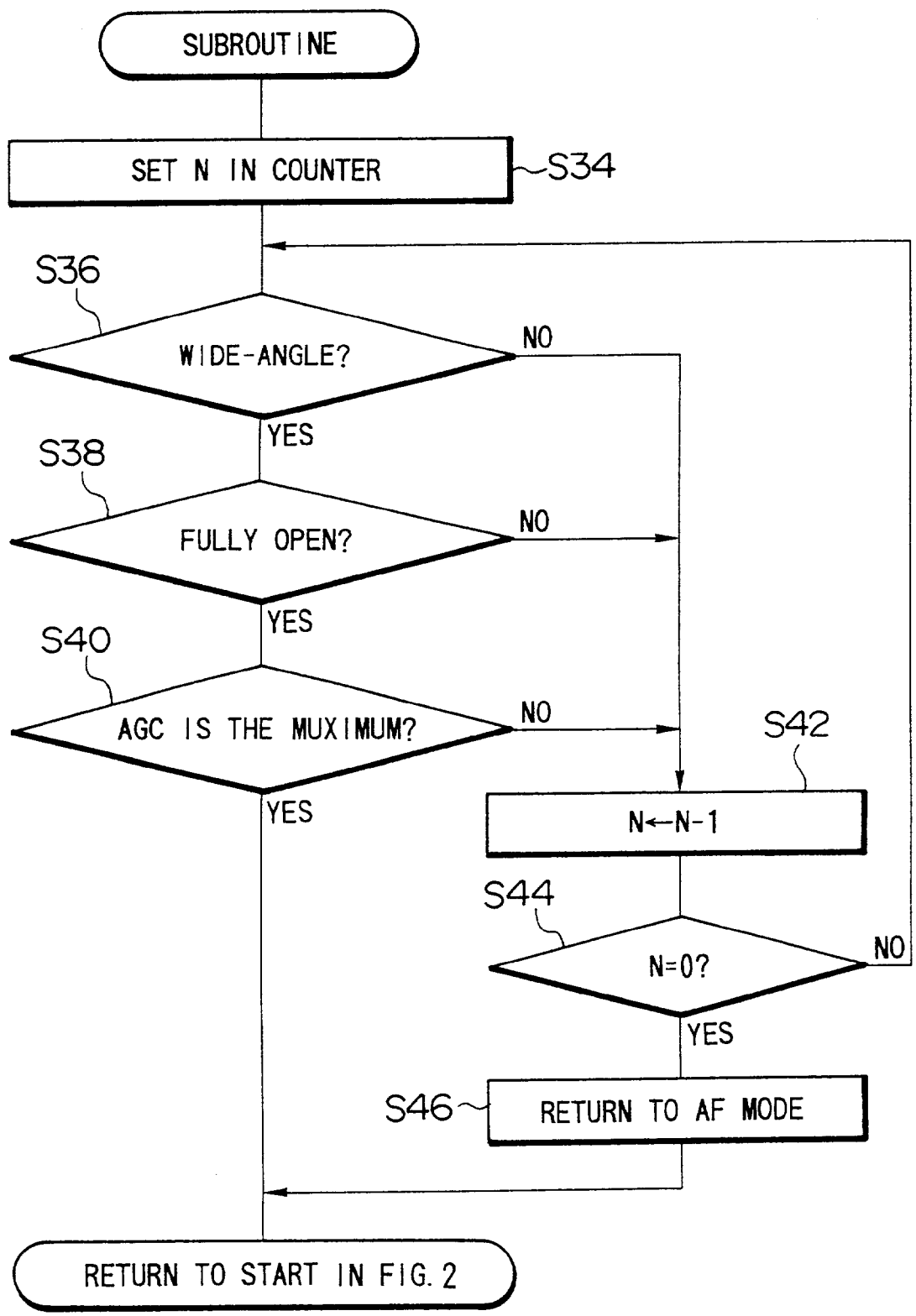
FIG. 3 is a view showing a subroutine in a flow chart of FIG. 2.

That is, as shown in FIG. 3, N is set in the counter (S34) so that a predetermined time can be checked. Thereafter, it is determined whether the taking lens 10 is in a wide-angle state or not (S36), whether the iris 12 is fully opened or not (S38), and whether the gain of the AGC amplifier 18 is the largest or not (S40).

If any one of the conditions in S36, S38 and S40 is not fulfilled, 1 is subtracted from the counter value N (S42), and then it is determined whether the subtracted N is 0 or not (S44). If the counter value N is not 0, the process returns to S36, and it is determined whether the above-mentioned conditions are fulfilled or not. If the counter value N is 0, the INF mode is returned to the AF mode (S46), and the process returns to START in FIG. 2.

On the other hand, the conditions in S36, S38 and S40 are fulfilled within a predetermined time (before N=0), the process returns to START in FIG. 2 with the INF mode being kept.

In this embodiment, the night view photographing mode switch is provided, and the INF mode is entered when the night view photographing mode switch is on and the conditions required for determining that the night view is photographed are fulfilled. However, the present invention is not restricted to this. The night view photographing mode switch may not be provided, and the INF mode may be entered when the conditions required for determining that the night view is photographed are fulfilled.

Moreover, if the night view photographing mode switch is provided, and if the night view photographing mode switch is on, the INF mode may be entered regardless of other conditions required for determining that the night view is photographed. Then, the INF mode is returned to the AF mode when the night view photographing mode switch is turned off.

Further, in addition to the aforementioned conditions, if it is determined that the AF cannot be properly controlled, that is, if the focus index of the AF device is less than a predetermined value indicating the properly-focused state, the mode may be switched to the INF mode.

Furthermore, the taking lens is not restricted to a lens which is able to sequentially change its focal point. The taking lens may be one which performs switching of the telephotographing and wide photographing.

As set forth hereinabove, according to the method of controlling the automatic focusing in the video camera of the present invention, if the taking lens is in the wide-angle state, and under a specific condition required for determining that the night view is photographed, the normal AF is not performed, and the taking lens is made to focus on a point at infinity. Thus, the photographing can be performed with the object being in focus even in the dark at night.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of controlling automatic focusing in a video camera comprising an automatic focusing device for focusing on an object image by moving a taking lens according to contrast detection, an automatic iris controller for controlling an iris according to the brightness of an object, and automatic gain controller for increasing gain of a video signal obtained from an image pickup device when a signal level of said video signal so permits; said method comprising the steps of:

monitoring states of the iris, the automatic gain controller, and the taking lens;

focusing said taking lens on a point at infinity, as defined by an infinity setting of the taking lens, instead of focusing by said contrast detection, if the following three conditions are fulfilled simultaneously during the monitoring step: said iris is fully opened by said automatic iris device, and the gain is increased to the maximum extent possible by said automatic gain controller, and said taking lens is in a wide-angle state;

wherein in the focusing step said taking lens is focused at the infinity setting if said three conditions are continuously fulfilled for more than a predetermined period of time.

2. The method of controlling automatic focusing in the video camera as defined in claim 1, wherein in the focusing step said taking lens is focused at the infinity setting if said three conditions are fulfilled and a focus index of said automatic focusing device is less than a predetermined value indicating a properly-focused state.

3. The method of controlling automatic focusing in the video camera as defined in claim 1, wherein said video camera has night view photographing mode switch; and wherein in said focusing step said taking lens is focused at the infinity setting if said night view photographing mode switch is on and said three conditions are fulfilled.

4. A method of controlling automatic focusing in a video camera comprising an automatic focusing device for focusing on an object image by moving a taking lens according to the contrast detection, an automatic iris controller for controlling an iris according to the brightness of an object, and automatic gain controller for increasing gain of a video signal obtained from an image pickup device when a signal level of said video signal so permits; said method comprising the steps of:

monitoring states of the iris, the automatic gain controller, and the taking lens, disabling automatic focusing by said contrast detection, if the following three conditions are fulfilled simultaneously during the monitoring step:said iris being fully opened by said automatic iris device, and the gain being increased to the maximum extent possible by said automatic gain controller, and said taking lens being in a wide-angle state; and focusing said taking lens on a point at infinity, as defined by an infinity setting of a taking lens during the disabling step, wherein said video camera has a new view photographing mode switch; and wherein in said focusing step said taking lens is focused at the infinity setting regardless of said three conditions ifsaid night view photographingmode switch in on.

5. A method of controlling automatic focusing in the video camera as defined in claim 1, wherein the focusing step further comprises said automatic focusing device adjusting said taking lens if one or more of said three conditions is not fulfilled continuously for more than a predetermined period of time after said taking lens is focused at the infinity setting.

6. The method of controlling automatic focusing in the video camera as defined in claim 1, wherein said video camera has a night view photographing mode switch; and wherein in said focusing step said taking lens is focused at the infinity setting if said night view photographing mode switch is on and said three conditions are fulfilled.

7. A method of controlling automatic focusing in a video camera comprising an automatic focusing device for focusing on an object image by moving a taking lens according to contrast detection, an automatic iris controller for controlling an iris according to the brightness of an object, and automatic gain controller for increasing gain of a video signal obtained from an image pickup device when a signal level of said video signal so permits; said method comprising the steps of:

monitoring states of the iris, the automatic gain controller, and the taking lens;

disabling automatic focusing by said contrast detection, if the following three conditions are fulfilled simultaneously during the monitoring step: said iris being fully opened by said automatic iris device, and the gain being increased to the maximum extent possible by said automatic gain controller, and said taking lens being in a wide-angle state; and focusing said taking lens on a point at infinity, as defined by an infinity setting of a taking lens during the disabling step, wherein said video camera has a night view photographing mode switch; and wherein in said focusing step said taking lens is focused at the infinity setting if said night view photographing mode switch is on and said three conditions are fulfilled.

8. A method of controlling automatic focusing in a video camera comprising an automatic focusing device for focusing on an object image by moving a taking lens according to contrast detection, an automatic iris controller for controlling an iris according to the brightness of an object, and automatic gain controller for increasing gain of a video signal obtained from an image pickup device when a signal level of said video signal so permits; said method comprising the steps of:

monitoring states of the iris, the automatic gain controller, and the taking lens;

disabling automatic focusing by said contrast detection, if the following three conditions are fulfilled simultaneously during the monitoring step: said iris being fully opened by said automatic iris device, and the gain being increased to the maximum extent possible by said automatic gain controller, and said taking lens being in a wide-angle state; and focusing said taking lens on a point at infinity, as defined by an infinity setting of a taking lens during the disabling step, wherein said video camera has night view photographing mode switching means; and wherein in said focusing step said taking lens is focused at the infinity setting regardless of said three conditions is said night view photographing mode switch is on.

9. A method of controlling automatic focusing in a video camera comprising an automatic focusing device for focusing on an object image by moving a taking lens according to contrast detection, an automatic iris controller for controlling an iris according to the brightness of an object, and automatic gain controller for increasing gain of a video signal obtained from an image pickup device when a signal level of said video signal so permits; said method comprising the steps of:

monitoring states of the iris, the automatic gain controller, and the taking lens;

disabling automatic focusing by said contrast detection, if the following three conditions are fulfilled simultaneously during the monitoring step: said iris being fully opened by said automatic iris device, and the gain being increased to the maximum extent possible by said automatic gain controller, and said taking lens being in a wide-angle state; and focusing said taking lens on a point at infinity, as defined by an infinity setting of a taking lens during the disabling step, wherein the focusing step further comprises said automatic focusing device adjusting said taking lens if one or more of said three conditions is not fulfilled continuously for more than a predetermined period of time after said taking lens is focused at the infinity setting.

10. A method of controlling focusing a video camera on an image; the video camera including an imaging element, an iris metering the extent of light illuminating the imaging element, an automatic gain control circuit amplifying a signal received from the imaging element, and a taking lens for focusing image illuminating the image element; the method of comprising the steps of:

opening the iris to a fully opened state;

increasing a gain of the automatic gain control circuit to an optimally maximum gain state selected so as to maintain adequate image quality of the image;

placing a taking lens in a wide-angle state;

monitoring the states of the iris, automatic gain control circuit and the taking lens;

focusing the taking lens at an infinity setting approximating a point at an infinity setting approximating a point at infinity, in response to the fully opened state, the maximum gain state, and the wide angle state being simultaneously fulfilled during the monitoring step; and disabling focusing by a contrast detection technique during the focusing step, wherein the states are monitored over a predetermined period of time; and wherein the lens is only focused at the infinity setting if the fully opened state, the maximum gain state, and the wide angle state persist over the predetermined period as determined by the monitoring step.

11. A method of controlling focusing a video camera on an image; the video camera including an imaging element, an iris metering the extent of light illuminating the imaging element, an automatic gain control circuit amplifying a signal received from the imaging element, and a taking lens for focusing image illuminating the image element; the method of comprising the steps of:

opening the iris to a fully opened state;

increasing a gain of the automatic gain control circuit to an optimally maximum gain state selected so as to maintain adequate image quality of the image;

placing a taking lens in a wide-angle state;

monitoring the states of the iris, automatic gain control circuit and the taking lens;

focusing the taking lens at an infinity setting approximating a point at an infinity setting approximating a point at infinity, in response to the fully opened state, the maximum gain state, and the wide angle state being simultaneously fulfilled during the monitoring step; and disabling focusing by a contrast detection technique during the focusing step, wherein monitoring the states of the iris, automatic gain control circuit, and the taking lens is accomplished via a microcomputer programmed with a decision-sensitive counter for timing the predetermined period of time.

* * * * *